United States Patent
Kern

[15] 3,688,313
[45] Aug. 29, 1972

[54] COMBINED CW AND PULSE TRACKING SYSTEMS

[72] Inventor: Neil C. Kern, Mesa, Ariz.
[73] Assignee: Motorola, Inc., Franklin Park, Ill.
[22] Filed: Dec. 19, 1966
[21] Appl. No.: 602,977

[52] U.S. Cl..........................343/7.3, 343/7 A, 343/9, 325/141
[51] Int. Cl..............................................G01s 9/16
[58] Field of Search........343/7, 7.3, 9, 7 A; 325/141, 325/144

[56] References Cited

UNITED STATES PATENTS 2,688,743  9/1954  Berger et al. ..............343/9 X
2,776,426  1/1957  Altman..........................343/9

FOREIGN PATENTS OR APPLICATIONS 461,749  2/1937  Great Britain.................325/141

Primary Examiner—T. H. Tubbesing
Attorney—Mueller, Aichele & Rauner

[57] ABSTRACT

A tracking system which utilizes combined CW and pulse signals. During initial target acquisition modes the CW signal portion is used for rapid velocity or frequency acquisition. Upon target acquisition in the CW mode the receiver of the system automatically switches to angle track and continues range search until range acquisition is accomplished using the pulse signals portions. If the target is lost, the receiver automatically reverts back to the CW acquisition mode. This disclosure includes description of the system, several transmitters for generating the combined CW and pulse signals and a receiver. Also described are a unique modulation scheme for pulse modulating a CW signal, and a received energy comparison scheme.

22 Claims, 7 Drawing Figures

INVENTOR.
Neil C. Kern

INVENTOR.
Neil C. Kern

BY
ATTY'S 3,688,313

COMBINED CW AND PULSE TRACKING SYSTEMS

BACKGROUND OF THE INVENTION

This invention relates to radar tracking systems and more particularly to tracking systems and components thereof utilizing a combined CW and pulse signal.

In acquiring extremely high velocity airborne vehicles with a pulse doppler radar there can be a severe problem of acquiring in both range and velocity at the same time. The doppler shift and range gate creates problems in acquisition and reacquisition of the target being tracked and extends the time required to acquire or detect a target.

Radar tracking systems are useful as a part of a range measurement system or homing types of systems, semi-active or fully active; DME, and the like.

The combination of tracking systems with such range tracking systems is well known. An improved tracking system can make a substantial contribution to the quality of performance of the total ranging system.

"Range" in the radar system is usually defined as being detected whenever the received pulse or other signal has a time of occurrence in a predetermined relationship with a locally generated reference signal. For example, in a pulse doppler type of tracking the receiver generates an equivalent pulse and when the received pulse has its leading edge time coincident with the locally generated pulse, range is defined as being detected. Tracking systems keep the receiver operation such that range is continuously being detected. This situation is often referred to as being "on target." By range tracking, a continuous range measurement may be automatically supplied to data processing systems.

SUMMARY OF THE INVENTION

It is an object of this invention to provide a range and velocity tracking system which acquires and reacquires targets with relative ease and speed.

It is a further object of this invention to provide a tracking system which combines the advantages of CW tracking and pulse doppler tracking.

It is another object of this invention to provide a tracking system which automatically switches between two tracking modes depending on whether or not the target is being properly tracked or not.

It is another object of this invention to provide a tracking system which substantially simultaneously searches range and frequency.

It is an object of this invention to provide a tracking transmitter which provides both CW and pulse outputs wherein the pulse modulation of the CW provides a very sharp and well-defined pulse even though the modulating pulse may be of undesired wave shape.

It is a further object of this invention to provide a ranging and tracking system transmitter providing both CW and pulse signal emissions utilizing a crossfield amplifier.

It is another object of this invention to provide a tracking system receiver which acquires target velocity and angle tracks on CW when the target is not yet acquired in range and angle tracks using the pulse doppler system after the target is acquired in range and is capable of automatically switching from one mode to the other.

It is yet another object of this invention to provide a unique comparison system in a tracking receiver for detecting range acquisition or loss of target range.

A feature of this invention includes the usage of both CW and pulse doppler signals with the CW signal being used to rapidly acquire or reacquire a target to be tracked and the pulse doppler signal being used to range track the target. In the generation of combined CW and pulse signals in one form of a transmitter, a pulse modulator drives a diode switch, which switch is selectively opened by the modulation pulse to provide extremely short rise times in the pulse modulation. These rise times are preserved even though the modulating pulse actuating the following RF amplifier may have a long rise time. The RF pulse is then added to the CW source in an RF summing network and the sum signal is fed to the antenna. In another form of a transmitter, the CW signal is provided by an X-band CW source which is supplied to a crossfield amplifier. When such amplifier is not being modulated by a pulse source, it acts as a wave guide to efficiently pass the CW signal to a transmitting antenna. Pulsing the crossfield amplifier raises the RF output by the tube gain thus providing both CW and pulse output.

A receiver built according to this invention is characterized by taking the received signal and gating it by three time gates, respectively, a late, early and extra early gate. In a CW mode the early gate channel is continuously receiving and processing the CW signal and cooperates with a velocity tracking system to rapidly adjust the receiver stable local oscillator (stalo) according to the received doppler shifted signal. Simultaneously therewith, the other two channels are continuously being gated by a ranging bias in a range search for the target to be tracked. The output signals of these two channels, which are continuously being gated by a radar gate are supplied to a comparator which determined which channel has received the greater energy. The ranging bias continues to search until the late gate has more energy than the extra early gate, indicating that a pulse signal has been detected in the late gate. The output signal of the comparator drives a switch which causes the early gate channel to be gated by the radar gate generator which then automatically switches receiver operation to a pulse doppler tracking mode.

DESCRIPTION OF THE PREFERRED EMBODIMENTS

Figure 1:
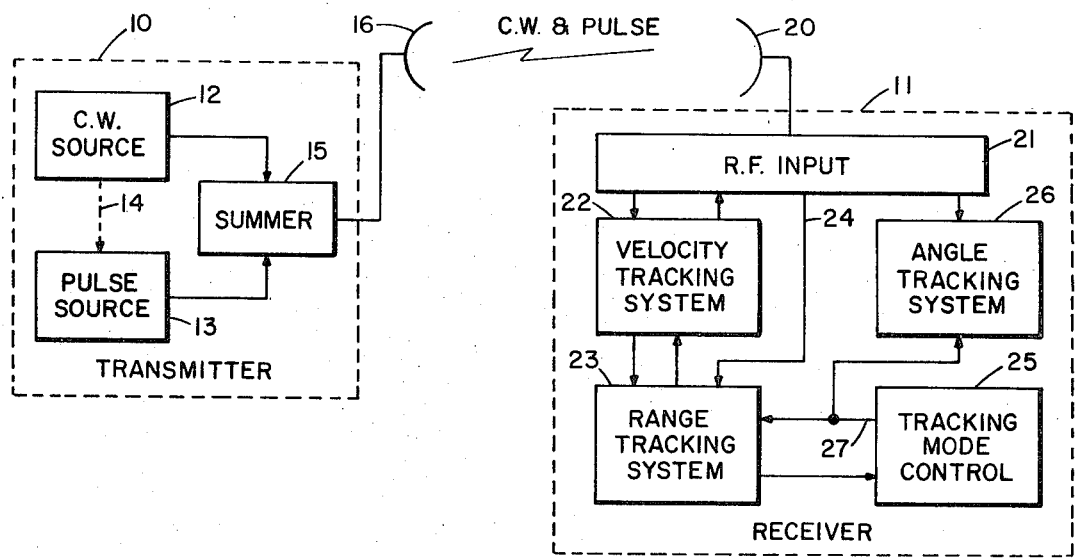
FIG. 1 is a simplified block diagram of a system embodying the present invention.

According to this invention, a radar tracking system is provided in which there is a transmitter having a CW source and a pulse source providing signals which are combined before being emitted by the transmitter antenna toward the receiver. The CW source serves to synchronize the transmitter such that the pulses are always provided in synchronization with the CW signal.

The receiver in this system is characterized in that it has an RF receiver portion which provides an intercepted signal to a velocity and range tracking system. The range tracking system cooperates with a velocity tracking system to adjust the oscillator of the RF section to compensate for doppler shift in the intercepted signal. The range tracking system has two additional channels which provide their signals to a tracking mode control for detecting acquisition or loss of target. Upon detection of target acquisition, the control emits a signal to the range tracking system automatically switching it from a CW mode to a pulse doppler mode.

A transmitter capable of providing a combined CW and pulse signal may include a CW source which supplies a signal directly to a summer apparatus. For synchronizing pulses with the CW signal a directional coupler is interposed between the two devices to take a portion of the CW signal and supply it to a circulator which in turn passes it to the pulse source for synchronization. The pulse source provides its pulses to the circulator through the same port as it receives the CW signals. The circulator passes the received pulses through an output port to the summer wherein the pulse signals are combined in synchronism with the CW signals and then supplied to the transmission portion of the transmitter.

Another form of a transmitter capable of providing combined CW pulse signals includes a CW source which supplies CW signals through one channel of the transmitter via a magic Tee. A directional coupler in this channel provides signals to a pulse modulating channel which has a diode switch receiving the CW signal. This diode switch is connected to an RF pulse amplifier which in turn is connected to the same magic Tee. The diode switch is selectively opened and closed by a pulse source which also drives the RF pulse amplifier. Even through the RF amplifier modulating pulse may have a relatively long rise time, the diode switch rapidly turns the CW on and off developing extremely sharp pulses from the CW signal. The magic Tee receives the pulse and CW signals and supplies them through two wave guides, one of which has a phase shifter therein. By adjusting the phase shifter the relative amplitude of the two signals, at the antenna, i.e., CW and the pulse signals, are adjusted. A second magic Tee couples the two wave-guide channels to the antenna.

A third form of a transmitter has a CW source connected to a crossfield amplifier through a ferrite isolator. A pulse source is also connected to the crossfield amplifier for modulating the CW signal. When no pulses are being supplied to the amplifier, it acts as a wave guide readily passing the CW signals to the transmission portion (antenna) of the transmitter. When the pulse source is providing modulating pulses to the amplifier, the amplitude of the CW is rapidly and greatly altered to provide combined pulse and CW signals from the transmitter.

A receiver embodying the present invention typically has a velocity tracking system including a stalo. The velocity system has a frequency control which receives signals from a range tracking system, which when the receiver is in a CW mode acts as a connection between the receiver RF portion and the velocity tracking system. The range tracking system has three range channels — one which corresponds to a late gate, one to an early gate, and the third to an extra early gate. The early and late gates pass signals which do the actual pulse doppler tracking. The early gate also is connected to the velocity tracking system for providing velocity tracking of the doppler shifted signals during the CW mode. The late and extra early gate channels are used to acquire the pulse modulation of the intercepted signal after velocity tracking has been initiated in the CW mode. In the CW mode, the early gate channel is continuously activated to pass the received signals on a non-gated basis. The other two gate channels are always gated, while when tracking in the pulse doppler mode the early channel is also gated.

The late and extra early gate channels supply their signals respectively to a comparator for determining the relative energies passed by the respective channels. One of the channels supplies its signals to a mixer for frequency translation to a frequency different than the frequency of the other channel; the two signals are then summed and supplied to a limiter. It is known that a limiter serves to supply a constant energy output. Therefore, if one channel is supplying a higher energy signal than the other it will dominate the limiter action and tend to submerge the signal from the channel having less energy. The limiter supplies its signal to a pair of filters one of which is tuned to the frequency of the translated signal and the other to the regular operating signal frequency. The output signals of the filters are respectively amplitude detected and summed, which provides a subtractive comparison of the two signals' energies. The operation is such that one amplitude detector will provide a positive output signal and the other one will only provide a negative output signal when respectively receiving signals are detected. Therefore, the output signal of the summer indicates which channel is receiving the greater energy by the polarity of its output signal. A switch means is responsive to such signals for switching the receiver operation between the CW and pulse tracking modes.

The receiver may include angle tracking systems for providing elevation and azimuth indications as well as range indications. The present invention is primarily concerned with the target acquisition and tracking aspect of ranging.

Referring now to FIG. 1 there is shown in block diagram form a system embodying the present invention. There is shown a transmitter 10 which emits combined CW and pulse signals to a receiver 11 which then is operative in response to such signals to track the range, i.e., continually detect even though range is rapidly changing, between the transmitter and the receiver. The transmitter includes CW oscillator source 12 and pulse source 13 which may be synchronized by the CW source as indicated by dotted line 14. The sources 12 and 13 supply their signals to a summer 15 which then in turn supplies the combined CW pulse signal to antenna 16.

Receiver 11 intercepts the signals by its antenna 20 and amplifies and manipulates same by an RF input section 21. The RF input section converts the intercepted signals into proper form for analysis and manipulation by other portions of the receiver. For example, the receiver may be a four-feed phase monopulse device using angle amplification for reducing the phase sensitivity of the receiver to the variations in IF amplifier phase drifts. RF section 21 supplies signals to a velocity (frequency) tracking system 22, and to range tracking system 23 over line 24. Velocity tracking system 22 and range tracking system 23 cooperate in a CW mode to velocity track the intercepted signal. The tracking status is indicated by the range tracking system 23 to tracking mode control 25. Control 25 detects the status and emits corresponding control signals over line 27 to systems 23 and 26. Control 25 is operative to switch range tracking system 23 between a CW tracking mode and a pulse doppler tracking mode, as later described. Angle tracking system 26 receives signals from RF input section 21 and tracks on the CW signal until the pulse doppler mode is initiated in the receiver.

Figure 2:
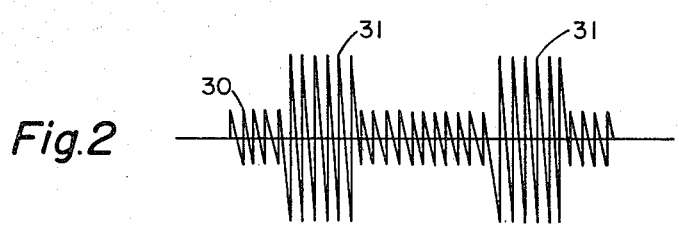
FIG. 2 is an idealized exemplary wave form showing a combined CW and pulse signal as may be used by the FIG. 1 illustrated system.

Referring now to FIG. 2 there is shown in idealized form a signal capable of being used with the FIG. 1 illustrated embodiment. A CW or continuous wave signal 30 is emitted by transmitter 10 and intercepted by the receiver 11. Pulses 31 are superimposed on the CW signal as shown for providing a combined pulse and CW radar tracking and ranging signal. This combined signal enables the system of FIG. 1 to rapidly acquire a target to be tracked and to accurately track that target by using the combination of pulses and CW in a unique manner.

Figure 3:
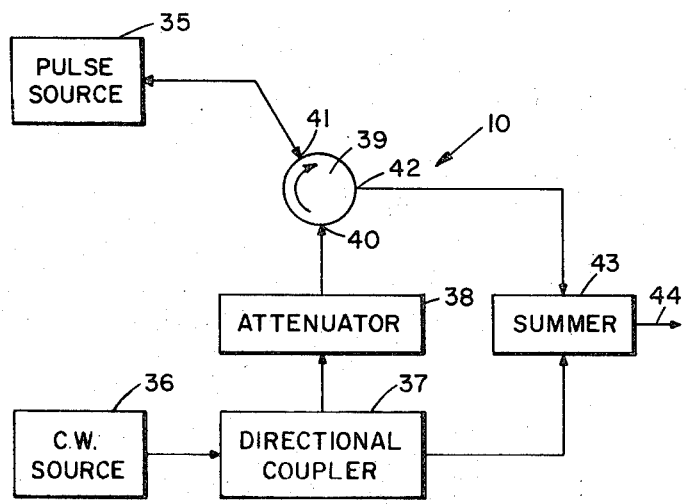
FIG. 3 is a simplified block diagram of a transmitter capable of transmitting the FIG. 2 illustrated wave form and utilizing a circulator for synchronizing a pulse source to a CW source.

Referring now to FIG. 3 there is shown in block diagram form a transmitter capable of generating the FIG. 2 illustrated signals. Pulse source 35 and CW source 36 respectively supply the pulse and CW signals. Directional coupler 37 receives CW signals from source 36 and passes a portion thereof through attenuator 38 to circulator 39 via input port 40. Circulator 39 passes the CW signals through port 41 to synchronize the operation of pulse source 35 with that of CW source 36. Pulse source 35 supplies CW synchronized RF pulses through port 41 and thence through output port 42 of circulator 39 to summer 43. Coupler 37 passes CW signals from source 36 to summer 43 which serves to combine the RF pulses from source 35 and the CW signals from source 36 to supply the signal of FIG. 2 on line 44. Pulse source 35 may be a keyed oscillator which is switched on and off to provide the higher amplitude bursts 31, as shown in FIG. 2.

Figure 4:
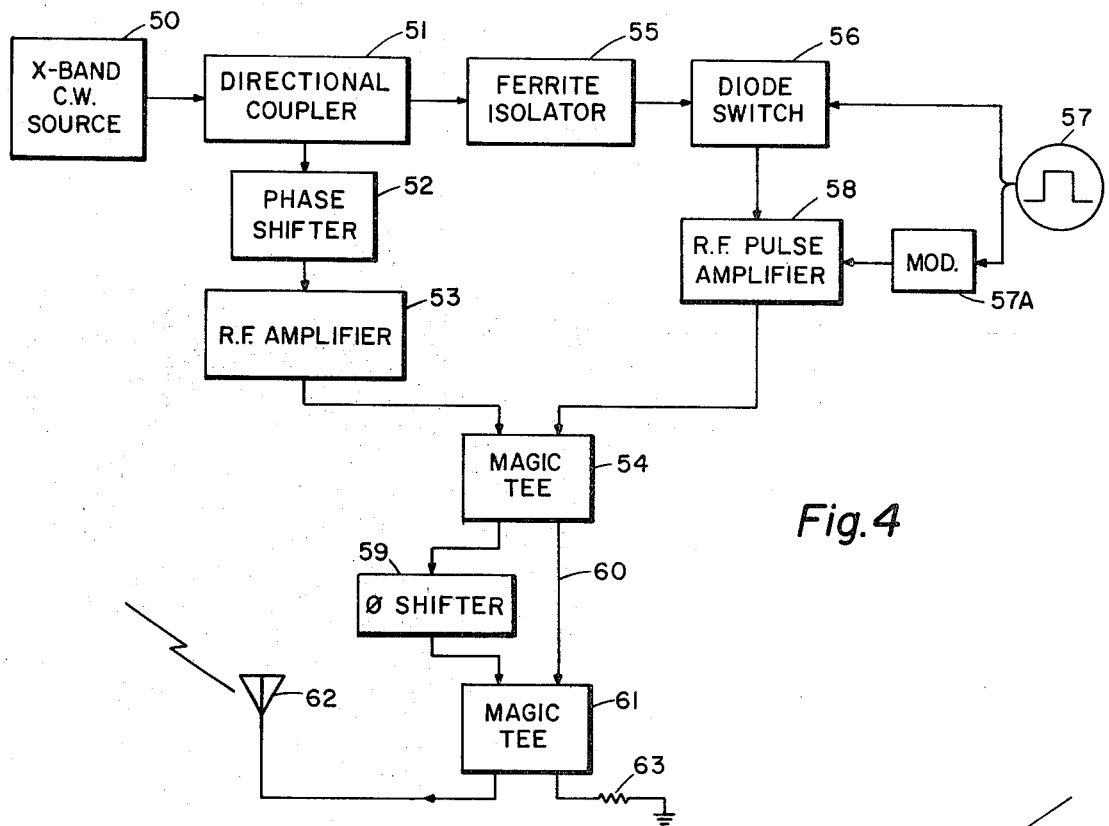
FIG. 4 is a simplified block diagram of a transmitter for transmitting a signal as shown in FIG. 2 and which utilizes a unique modulating scheme wherein a diode switch receives the CW signal and drives an RF amplifier selectively controlled by a pulse source.

Referring now to FIG. 4 there is shown a second version of a transmitter capable of providing the FIG. 2 illustrated signals. In this transmitter X-band CW source 50 supplies CW signals through directional coupler 51 to a pair of channels in the transmitter; one of which supplies CW signals, the other supplies RF pulse signals. The CW signals are supplied through Phase shifter 52 which compensates for any additional phase shifts in the RF pulse channel. RF amplifier 53 receives the phase-shifted signals and supplies them to magic Tee 54 in which the pulse and CW signals are combined, as will be later referred to.

The pulse channel of the transmitter receives the CW signals through ferrite isolator 55 which in turn supplies signals to diode switch 56 of usual construction. Switch 56 is selectively opened and closed by modulating pulse source 57. Switch 56 is constructed such that it rapidly turns on and off to provide a sharp or short rise time in signals it supplies to RF pulse amplifier 58. Pulse source 57 also simultaneously actuates RF pulse amplifier 58 through modulator 57A for turning amplifier 58 on when diode switch 56 is on. Modulator 57A may provide signals to RF pulse amplifier 58 having relatively long rise times; however, since diode switch 56 is rapidly acting, the rise time of the modulated signal supplied to magic Tee 54 has a rise time determined by the diode switch 56. Therefore, modulator 57A may supply relatively long rise time pulses, yet short rise time RF pulses 31 (FIG. 2) are provided.

Magic Tee 54 supplies signals to two separate channels 59 and 60. Channel 59 is a wave-guide having a phase shifter which is adjustable to determine the distribution of power by magic Tee 61 between radiating antenna 62 and resistive load 63. Channel 60 may be any known wave guide. Magic Tee 54 serves to sum signals from RF amplifier 53 and RF pulse amplifier 58 and then distributes them to the two channels. Magic Tee 61 in turn receives the two signals and redistributes them to antenna 62 and load 63. When phase shifter 59 is set to zero phase shift, all of the energy supplied to radiating antenna 62 will be CW energy; no RF pulse energy from modulator 58 is sent thereto. All the pulse energy is supplied to load 63 wherein it is dissipated. By resetting phase shifter 59 to 180° phase shift only RF pulse energy is supplied to antenna 62; therefore, between successive RF pulses there is no CW signal. Adjusting phase shifter 59 intermediate the two extremes selects an amplitude ratio of the RF pulses 31 (FIG. 2) to the amplitude of the intermediate CW signal. It is desired that the amplitude difference between the RF pulses and the CW signal be at least 12 db.

Figure 5:
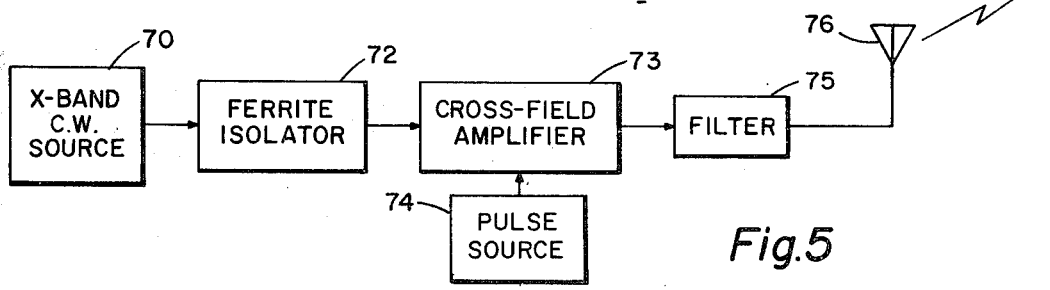
FIG. 5 is a simplified block diagram of a transmitter capable of transmitting the signals shown in FIG. 2 and utilizing a crossfield amplifier for combining CW and pulse signals.

Another form of transmitter is illustrated in block diagram form in FIG. 5. X-band CW source 70 supplies CW signals through isolator 72 to the signal input of crossfield amplifier 73. Pulse source 74 selectively modulates crossfield amplifier 73. Crossfield amplifier 73 acts as a wave guide to the received CW signal whenever it is not receiving a pulse from source 74 and pulse modulates the CW signal when a pulse is received from source 74. Amplifier 73 supplies its signals through filter 75 (such as a band pass filter) to radiating antenna 76. One advantage of this transmitter is the fact that the CW signal is supplied through amplifier 73 very efficiently whenever RF pulses are not being transmitted.

Figure 6:
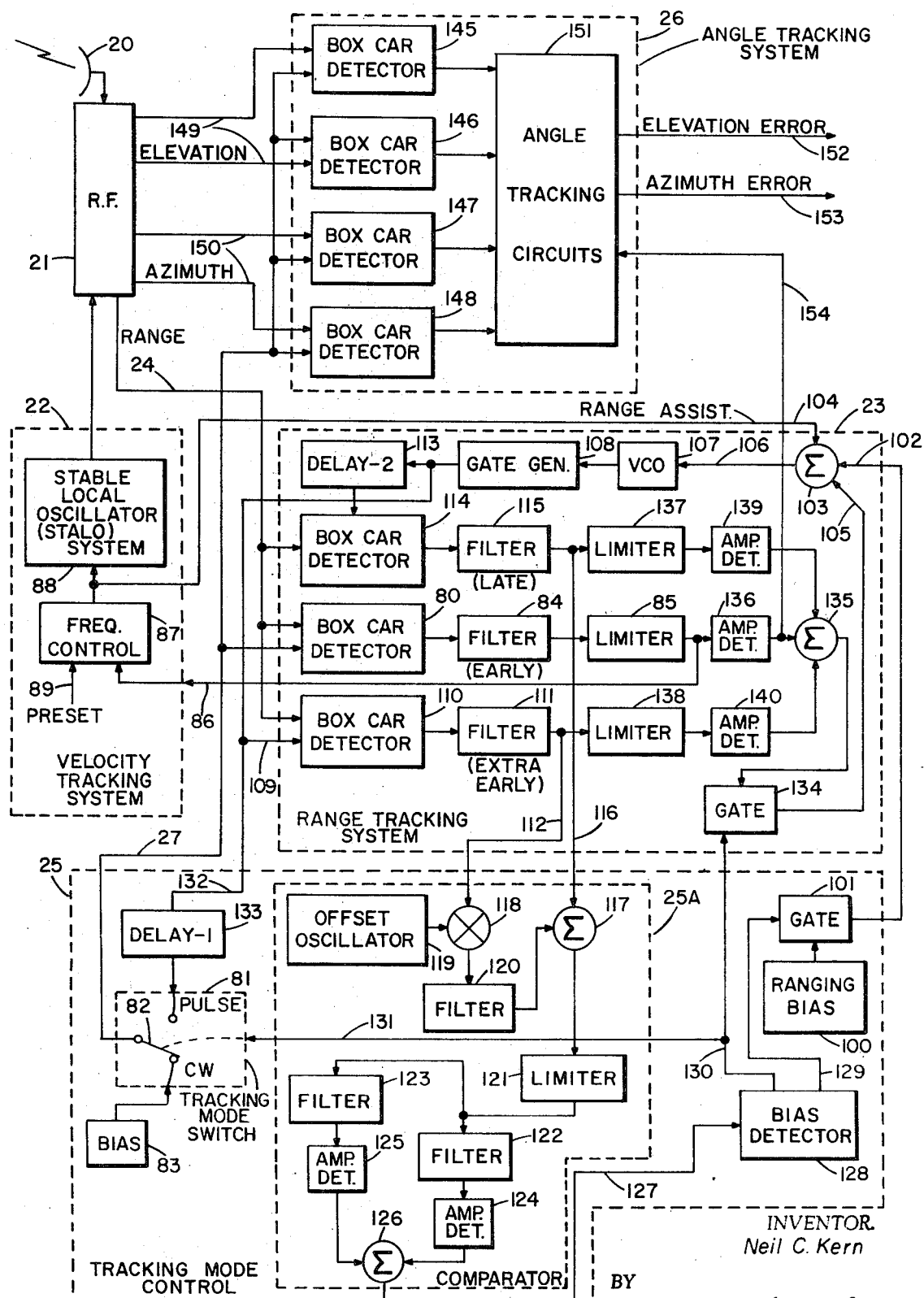
FIG. 6 is a simplified block diagram of a receiver embodying the present invention and capable of tracking a target from which the FIG. 2 signal is received.

Turning now to FIG. 6 there is shown in block diagram form a receiver embodying the teachings of the present invention. The numbers appearing in FIG. 1 are used to identify like parts in FIG. 6. The CW pulse signals intercepted by antenna 20 are supplied to RF section 21. The construction of section 21 is not important to the present invention. It is sufficient to state that this section interfaces the received or intercepted signals with the receiver circuits.

When the receiver is initially turned on it is not tracking any target. Therefore, the first operational mode is the CW or velocity (frequency shift) track mode. The term used herein will be the "CW mode." The CW mode is used to velocity and angle acquire a target.

In the CW mode the ranging signal is supplied by section 21 over line 24 to range tracking system 23. To pass all line 24 signals, box car detector 80 is continuously held open by a DC signal supplied over line 27 and switch 81 from DC bias source 83. Switch arm 82 is shown as connecting the bias source 83 to an output terminal of switch 81. When switch arm 82 is set as shown, the receiver is in the CW mode. In actual practice, switch 81 is electronic rather than as schematically illustrated.

Detector 80 passes all line 24 signals to band pass filter 84 and limiter 85, thence over line 86 to velocity tracking system 22. The limited and filtered signal is supplied to frequency control 87 which in turn controls stable local oscillator (stalo) system 88 which in turn supplies the locally generated modulating signals to RF section 21 in a known manner. The just described loop may be compared with a frequency-lock loop used to frequency track high velocity targets. A preset signal may be supplied to control 87 over line 89. Such a preset signal may be supplied by digital computer, accelerometer or other type of control and sensing device. The above described loop from line 24 through stalo 88 provides a constantly operating frequency tracking loop which quickly adjusts the system 88 to doppler shifted frequency of the intercepted wave.

A range search is conducted simultaneously with the velocity tracking operation. Such range search is first functionally described by referring now to FIG. 7. Line 90 represents a typical envelope of a received pulse (which of course contains the CW signal within the envelope). The three time or radar gates, the extra early gate 91, early gate 92 and late gate 93 are shown as centered about the leading edge of pulse 90. As shown, the rising wave front is centered in early gate 92, which is the desired position in the pulse tracking mode of the illustrated receiver. It is seen that the energy passing through radar gate 93 is substantially greater than that energy passing through radar gate 91. The relative passed energies indicative that the receiver is or may be properly range tracking the target, i.e., range is detected. When the energy through extra early gate 91 is equal to or greater than through late gate 93, there is a clear indication that the receiver is not tracking the target. In the former situation the receiver is automatically switched to the pulse tracking mode, while in the latter, the receiver is automatically switched to the CW mode for acquiring or reacquiring target range. The relative energies in the respective gates used to indicate "on or off target" is a matter of system design choice.

The range sweep used to obtain range "lock-on" or detection may be provided in any usual manner. The range sweep illustrated in the FIG. 6 receiver is provided by a ranging bias source 100, which supplies a DC potential through normally open gate 101, thence over line 102 to range summer circuit 103 for adjusting VCO 107 frequency. Other inputs to summer circuit 103 include a range assist line 104 from velocity system 22 and the pulse tracking line 105, later described. In the CW mode, signals appear at the summer 103 only on lines 102 and 104, the line 104 signal providing velocity compensation. The summed signal is supplied over line 106 to control the frequency of VCO 107. The presently illustrated system is arranged such that the pulse repetitive frequency (PRF) of the transmitter is at a first frequency and the ranging bias from source 100 is operative to adjust the VCO 107 frequency to a different frequency from the transmitter PRF. Note, it is the PRF and not the CW signal frequency which is determinative here. Since the transmitter and VCO 107 frequencies are different, there is provided a continuing shift in phase between the respective output signals which is operative to cause the radar gates (gates 91 and 93 of FIG. 7), as supplied by gate generator 108, to continually shift in time along the range with respect to the transmitted pulse signals. The gate is shifted along the range either toward maximum range or away from maximum range depending on which frequency, i.e., the transmitter or receiver, is greater. It is remembered that in the CW mode, box car detector 80, which in the pulse tracking mode corresponds to early gate 92, is held continuously open by bias source 83.

The operation of extra early gate 91 and the late gate 93 to provide range detection or target acquisition will now be explained. Gate generator 108 supplies its pulse signal over line 109 to selectively open box car detector 110 to pass signals through filter 111 and thence over line 112 to comparator 25A, yet to be described. The gate generator 108 pulses are also supplied through delay line 113 which serves to delay the pulse two gate periods; that is, referring to FIG. 7 from the extra early gate 91 to late gate 93. The two-gate period delayed gate 93 selectively activates box car detector 114 to pass signals from line 24 through filter 115, thence over line 116 to comparator 25A.

Comparator 25A receives the signals from extra early gate 91 and late gate 93, frequency translates one of the signals, passes both signals through a limiter 121 which favors the stronger signal of the two, and then frequency separates and amplitude detects the limited signals. The stronger signal is represented by a large detected output signal while the weaker signal may be completely erased by the limiting action.

Comparator 25A includes a summing circuit 117 which directly receives the signals from the late gate channel over line 116. The signals from the extra early gate 91 on line 112 are frequency translated by mixer 118 as driven by offset oscillator 119, thence filtered by bandpass filter 120 and then applied to summer circuit 117. For example, filter 115, as well as filters 84 and 111, may have a bandwidth of 30 KHz with a center frequency of 88KHz. Offset oscillator 119 may have a frequency of 220 KHz with mixer 118 subtracting the 88 KHz from the 220 KHz to provide a center frequency in filter 120 of 132 KHz. Filter 120 may also have a bandwidth of 30 KHz.

The summer 117 summed signals are supplied to limiter 121. It is known that a limiter acts to favor the stronger or higher energy signals that it receives. It has a characteristics of supplying a constant energy output, therefore, a large signal will tend to submerge a lower energy signal. It is this characteristic that is used in this comparator to provide detection of which channel, i.e., the late gate or extra early gate, has the greater energy for indicating target acquisition or loss. The comparison level may be adjusted by amplifying one gated signal more than the other (or in other ways) which results in different energy thresholds indicating "on target." Limiter 121 supplies its limited signal to filters 122 and 123 which respectively are tuned to 74 KHz for passing the portion of limited signal from late gate 93 and to 118 KHz for passing the frequency offset signal from the extra early gate 91. The bandwidth of the filters are quite narrow, i.e., for example 200 Hz. A pair of amplitude detectors 124 and 125 respectively receive the narrow-band filtered signals and amplitude detect the same. Detector 124 is characterized in that it is a positive amplitude detector. By this phrase it is meant that receipt of a high amplitude signal from filter 122 carries a positive output DC signal to be supplied to summer circuit 126. Detector 125 is a negative amplitude detector, that is, whenever it receives a high amplitude signal from filter 123 it supplies a negative DC potential to summer circuit 126. Therefore, a positive signal from circuit 126 indicates the receiver has acquired its target while a zero or negative signal indicates the target is not being tracked.

The resultant summer 126 comparison indicating signal is supplied over line 127 to bias detector 128. Bias detector 128 has a built-in threshold and detects the polarity of output signals to indicate which gate is passing the higher energy. When extra early gate 91 is passing substantial energy with respect to the energy passed by late gate 93 (FIG. 7) bias detector 128 supplies gate enabling signal over line 129 to open gate 101 to pass the ranging bias signal from source 100, as previously described. However, when late gate 93 is passing more energy than extra early gate 91 (tracking indicated), bias detector 128 detects same and switches the enabling signal from line 129 to line 130 for opening gate 134 and closing gate 101 and supplying such enabling signal over line 131 to move switch arm 82 from the CW terminal to the pulse terminal. Switch 81 is an electronic switch in a practical embodiment. Bias detector 128 may take the form of a Schmidt trigger circuit.

Figure 7:
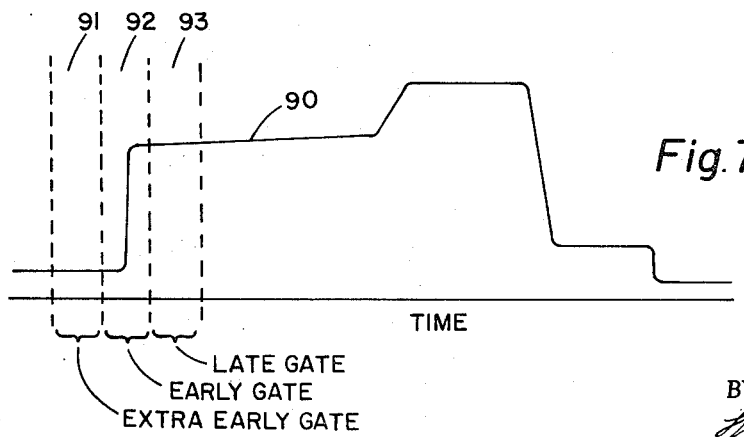
FIG. 7 illustrates a simplified wave form of a received pulse showing the relationship of the three radar gates when the receiver of FIG. 6 is properly tracking a target indicated by the illustrated wave.

Pulse tracking gate 134 is opened for passing the output signal of summer circuit 135 to line 105 and thence to summer circuit 103 for controlling VCO 107. The previously described gate generator 108 supplies its radar gate signals over line 132 through delay line 133 to the "pulse" terminal of switch 81. Delay line 133 delays the gate pulse one gate period to generate radar gate 92 (FIG. 7). In the range tracking mode switch 81 passes the delayed early gate pulse to line 27, thence to box car detector 80 for selectively activating the detector 80 in a well known range tracking manner. Detector 80 supplies its gated detected signals through filter 84 and limiter 85 to amplitude detector 136. The latter three items constitute a circuit for temporarily holding the detected range signals. Detector 136 supplies the detected range signal in DC amplitude form to summer circuit 135 wherein it is summed with the corresponding DC output signals from the late and extra early gates, respectively, as provided through limiters 137 and 138 and amplitude detectors 139 and 140. The latter circuits also serve to hold the energy detected by the respective box car detectors.

Summer 135 is constructed such as to be more responsive to the output signal provided by detector 136 than the signals provided by detectors 139 and 140, therefore, only the target leading edge will appear in the early gate 92 during range tracking.

The above description shows that in the described receiver the velocity or frequency search and the range search are effectively conducted simultaneously thus eliminating time lost in a serial doppler search of each so-called range bin.

In addition to radar gating box car detector 80 for providing the early gate 92, the signal passed by switch 81 to line 27 is also supplied to angle tracking system 26 for selectively actuating the four box car detectors 145, 146, 147 and 148. Such detectors receive elevation and azimuth signals from section 21 respectively over lines 149 and 150. The four box car detectors supply detected signals in either the CW or pulse tracking mode to angle tracking circuits 151 wherein the elevation and azimuth are determined and supplied over lines 152 and 153 to a measurement circuit (not shown). A range information indicating signal from early gate 92 is supplied by amplitude detector 136 (range tracking system 23) over line 154 to angle tracking circuit 151. Since the operation of circuits 151 are not pertinent to the present invention, they will not be further described, it sufficing to say they may include any known angle tracking circuits and range measurement devices.

I claim:

1. A radar tracking system having a transmitter for emitting signals and a receiver for intercepting emitted signals and manipulating such intercepted signals to track frequency and range, with such signals being subject to doppler shifts,
the improvement including in combination,
means in the transmitter for supplying phase coherent continuous-wave and RF pulse signals which are emitted one with the other as a composite signal,
CW means in the receiver responsive to intercepted continuous-wave signals to adjust receiver operation to the frequency of the intercepted wave and range means in the receiver responsive to such adjustment to initiate a tracking operation for tracking range in response to intercepted pulse signals.

2. The system as set forth in claim 1 wherein said range means is responsive to intercepted pulse signals for adjusting receiver operation to detect range simultaneously with the CW means adjusting receiver operation to the frequency of the intercepted wave and further operative upon detection of range to initiate a range tracking operation.

3. The system set forth in claim 1 wherein the receiver includes a pair of range tracking channels both of which simultaneously receive said intercepted pulse signals,
energy comparison means connected to said range channels and responsive to detecting a first pulse energy in a first one of said channels to supply a first indication that the receiver has detected range and responsive to such first indication for initiating a range tracking operation and responsive to detecting a second energy in a second one of said channels to supply a second indication and responsive to said second indication to initiate frequency tracking by said CW means to thereby readjust the receiver operation to the frequency of the intercepted wave.

4. The system of claim 3 wherein said CW means includes a velocity tracking system for adjusting a receiver tuned frequency toward the intercepted CW signal frequency, a third range channel in said range means for receiving said intercepted CW and pulse signals and connected to said velocity tracking system for indicating the relationship of the intercepted CW signal frequency to a frequency of a signal generated in said velocity tracking system and accepting said CW signals while the receiver is being adjusted to said intercepted CW signal frequency, and control means in the receiver connected to said comparison means and operative to selectively initiate a range tracking operation in response to said first indication and connected to said third channel for selectively activating said channel during interception of said pulse signals for blocking out certain CW signals intermediate said pulse signals and being responsive to said second indication to actuate said third channel to continuously receive signal.

5. The system as in claim 4 wherein said comparison means includes frequency translating means for frequency translating signals received from said second channel, summing means for summing the signals from said first channel with said frequency translated signals, limiter means connected to the summer means for receiving and limiting said summed signals, frequency responsive energy detector means responsive to said limited signals to indicate which of said summed and limited signals has a greater energy, said comparison means supplying said first indication when said first channel has greater energy and supplying said second indication when said second channel has greater energy.

6. The system of claim 5 wherein said energy detector means comprises, a pair of filter means one of which is tuned to said frequency translated signal and both being connected to the limiter for receiving the limited summed signal, amplitude detector means connected to said filter means and supplying opposite polarity signals when a signal is passed by the respective filters, summer means connected to the detector means for summing the amplitude detector outputs to selectively supply said first and second indications of said summed and limited signal energy.

7. The system of claim 1 wherein said transmitter means comprises, a source of CW signals, a directional coupler receiving said CW signals and supplying said CW signals as first and second output CW signals, a first channel for passing said first output CW signals, a second channel including pulse modulating means for forming pulsed RF CW signals from said second output CW signals, and energy division means connected to said channels for adjusting the amplitude of said pulsed RF signals with respect to the amplitude of CW signals intermediate successive pulse signals, and means for transmitting said signals.

8. The system of claim 7 wherein said second channel comprises a diode switch and a modulator in series connection, a modulating signal source connected to both said switch and said modulator for simultaneously selectively actuating same to form pulsed RF signals.

9. The system of claim 1 wherein said transmitter comprises a transmitting portion and a source of CW signals, a crossfield amplifier receiving said CW signals for passing them to said transmitting portion of the transmitter, and a modulating signal source connected to said amplifier for selectively actuating same to rapidly alter the amplitude of CW signals to form pulse components in signals supplied to the transmitting portion.

10. A transmitter for a radar tracking system including in combination, a source of CW signals, a directional coupler receiving said CW signals and supplying said CW signals as first and second CW signals, a first channel passing said first CW signals, a second channel including pulse modulating means for selectively forming pulsed RF signals from said received CW signals, means connected to said first and second channels for controlling the relative amplitudes of the said pulsed RF signals and CW signals occurring intermediate successive pulsed RF signals, and means connected to said last mentioned means for transmitting said signals.

11. The transmitter of claim 10 wherein said second channel includes an interconnected electroresponsive switch and an RF pulse amplifier with said switch receiving and selectively forming RF pulses from said CW signals and said amplifier receiving said RF pulses, a pulse source connected to both said switch and said amplifier for simultaneously selectively supplying pulses thereto.

12. A transmitter for a ranging system and having a transmission portion, the improvement including in combination, a source of CW signals, a crossfield amplifier receiving said CW signals for passing them to a radiating portion of the transmitter, and a pulse source connected to said amplifier for selectively altering the amplitude of CW signals supplied to the transmission portion.

13. A receiver for a radar tracking system having means for intercepting a ranging signal and a portion to frequency track such intercepted signal, and means for deriving a range indicating signal from such intercepted signal, the signal having both CW and RF pulse signal components, the receiver improvement including in combination,
early gate means including a selectively actuable detector, energy control means and amplitude detectors, and receiving said range signals,
said energy control means supplying an output signal to the frequency tracking portion for adjusting the tuning of the receiver to a frequency having a predetermined relationship to an intercepted signal CW component frequency,
a pair of additional gate means consisting of a late and an extra early gate means each including selectively actuable detectors, energy control means and amplitude detectors,
tracking mode control means connected to said gate means selectively actuable detectors for selectively sequentially actuating said extra early and late gate detectors according to range being detected and always actuating said extra early gate means first, and
said tracking mode control means including energy comparison means for detecting and comparing energies in said gate means and being responsive to detecting an energy in one of said additional gate means greater than an energy in another additional gate means to selectively actuate said early gate means in accordance with signals received from all said gate means amplitude detectors, and actuating said early gate means detector only after actuating said extra early gate means.

14. The receiver set forth in claim 13 wherein said energy comparison means includes frequency translating means connected to a first one of said additional gate means,
signal summing means connected to a second one of said additional gate means to said frequency translating means for receiving signals therefrom and supplying a summation of such signals,
a limiter receiving said summation signal and supplying an energy limited summation signal,
frequency responsive amplitude detector means responsive to said limited signal and supplying indicia of which one of said pair of gate means has a greater energy signal and selectively actuating said early gate means detector in accordance with said indicia.

15. The receiver set forth in claim 14 wherein each of said energy control means consists of a filter and a limiter, the filter receiving signals from the respective gate means detectors and supplying band passed signals to the limiter.

16. The receiver set forth in claim 15 wherein said energy comparison means is connected to both said additional gate means filter means for receiving filtered non-limited signals therefrom.

17. The receiver set forth in claim 16 wherein said one additional gate means is the late gate means whereby the receiver is operative to track on wavefronts of said intercepted RF pulse signals.

18. The receiver set forth in claim 17 wherein said comparison means amplitude detector means has first and second filters for respectively passing a frequency translated limited signal and a limited second channel signal derived from said limited summation signal,
a pair of amplitude detectors respectively connected to said first and second filters for supplying amplitude detected signals,
amplitude summation means responsive to said amplitude detected signals for supplying said indicia.

19. The receiver set forth in claim 18 wherein said amplitudes summation means includes two-state switching means responsive to said amplitude detected signals indicating a first relative energy in said late gate means to supply a first digital signal for causing a tracking operation and to said detected signals indicating a greater energy in said extra early gate to inhibit said first digital signal, and
said control means continuously actuating said early gate detector in response to said first digital signal being inhibited.

20. The receiver set forth in claim 13 further including bias switching means responsive to detection of greater energy in said late gate to supply a digital bias signal,
means combining signals from said gate means amplitude detectors forming a combined range tracking signal,
gate generating means in said tracking mode control means and responsive to said bias signal to actuate said early gate means detector in accordance with said combined signal and operative when not receiving said bias signal to actuate said late and extra early gate detectors such that the frequency of actuations is different than a repetitive frequency of the pulse components of the intercepted signal and simultaneously continuously actuate said early gate detector.

21. The receiver set forth in claim 13 wherein said tracking mode control means includes signal summing means connected to all said amplitude detectors for receiving amplitude detected signals therefrom and supplying a sum signal derived from said amplitude detected signals,
said signal summing means weighting said sum signal to that of said early gate means amplitude detector supplied amplitude detected signal for causing said gate generating means to actuate said selectively actuable detectors in each said gate means such that said early gate means tends to receive more signal energy than said extra early gate means but less signal energy than said late gate means.

22. A radar tracking system having a transmitter for emitting signals and a receiver for intercepting emitted signals with circuits for manipulating such intercepted signals to track frequency and range, with such signals being subject to doppler shifts,
the improvement, including in combination,
means in the transmitter for generating a continuous wave signal having repetitive amplitude perturbations each with a leading and trailing portion and such continuous wave signal with repetitive amplitude perturbations being emitted by the transmitter as a composite signal,
CW means in the receiver responsive to intercepted continuous wave signals to adjust receiver circuits to the frequency of the intercepted wave and range means in the receiver having selectively actuated detector means and including tracking mode control means operative to detect adjustment of certain receiver circuits and responsive to said certain receiver circuits being adjusted to the frequency of the intercepted wave to actuate said selectively actuated detector means in approximate time coincidence with one of said portions for detecting said amplitude perturbations for initiating a range tracking operation in said range means, said range means being responsive during said range tracking operation to said one portion of said amplitude perturbation to adjust said tracking mode control such that actuation of said selectively actuated detector means is maintained in a predetermined time relationship to repetitive occurrence of said one portion whereby said receiver is continuously adjusted for continuously detecting said amplitude perturbations.

* * * * *